United States Patent
Ansari et al.

(10) Patent No.: US 12,001,264 B2
(45) Date of Patent: Jun. 4, 2024

(54) ENHANCED DISPLAY WAKEUP UTILIZING FAST PORT SCANNING

(71) Applicant: Intel Corporation, Santa Clara, CA (US)

(72) Inventors: Nausheen Ansari, Folsom, CA (US); Roland P. Wooster, Folsom, CA (US); Perazhi Sameer Kalathil, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 802 days.

(21) Appl. No.: 16/913,880

(22) Filed: Jun. 26, 2020

(65) Prior Publication Data

US 2020/0326769 A1  Oct. 15, 2020

(51) Int. Cl.
*G09G 3/20* (2006.01)
*G06F 1/3234* (2019.01)
*G06F 1/3218* (2019.01)
*G09G 5/00* (2006.01)

(52) U.S. Cl.
CPC ............ *G06F 1/3265* (2013.01); *G09G 3/20* (2013.01); *G06F 1/3218* (2013.01); *G09G 3/2092* (2013.01); *G09G 5/006* (2013.01); *G09G 2330/022* (2013.01); *G09G 2370/04* (2013.01); *Y02D 10/00* (2018.01)

(58) Field of Classification Search
CPC .............. G09G 3/20–92; G09G 5/006; G09G 2330/022; G09G 2370/04; G06F 1/3218; G06F 1/3265; Y02D 10/00
See application file for complete search history.

(56) References Cited

U.S. PATENT DOCUMENTS

| | | | |
|---|---|---|---|
| 2008/0122987 A1* | 5/2008 | Chang | H04N 21/436 348/725 |
| 2008/0297660 A1* | 12/2008 | Shioya | H04N 5/44 348/705 |
| 2010/0097529 A1* | 4/2010 | Tokoro | G09G 5/006 348/730 |
| 2019/0348046 A1* | 11/2019 | Tsukamoto | G06F 3/167 |
| 2019/0391633 A1* | 12/2019 | Wu | G06F 1/28 |

OTHER PUBLICATIONS

Microsoft, "Key Concepts," available online at https://docs.microsoft.com/en-us/windows-hardware/design/device-experiences/functional-overview-summary; Apr. 22, 2020 (2 pages).
Microsoft, "What is Modern Standby," available online at https://docs.microsoft.com/en-us/windows-hardware/design/device-experiences/modern-standby, Apr. 23, 2020 (4 pages).

* cited by examiner

*Primary Examiner* — Adam J Snyder
(74) *Attorney, Agent, or Firm* — Alliance IP, LLC (57) ABSTRACT

An apparatus comprising an interface to receive a video signal transmitted by a video source device to a first port of a plurality of ports of a display; and a controller comprising circuitry, the controller to responsive to a detection that the video source device is to enter a standby mode, cause the display to enter a low power state; and upon waking from the low power state, scan the first port of the plurality of ports for a communication from the video source device and quiesce scanning of the remaining one or more ports of the plurality of ports of the display.

22 Claims, 6 Drawing Sheets

ENHANCED DISPLAY WAKEUP UTILIZING FAST PORT SCANNING

BACKGROUND

Modern computing systems such as desktop computing systems may include a display coupled to a computing device. The display may be coupled to the computing device using a link through which the display and the computing device communicate.

DETAILED DESCRIPTION

Figure 1:
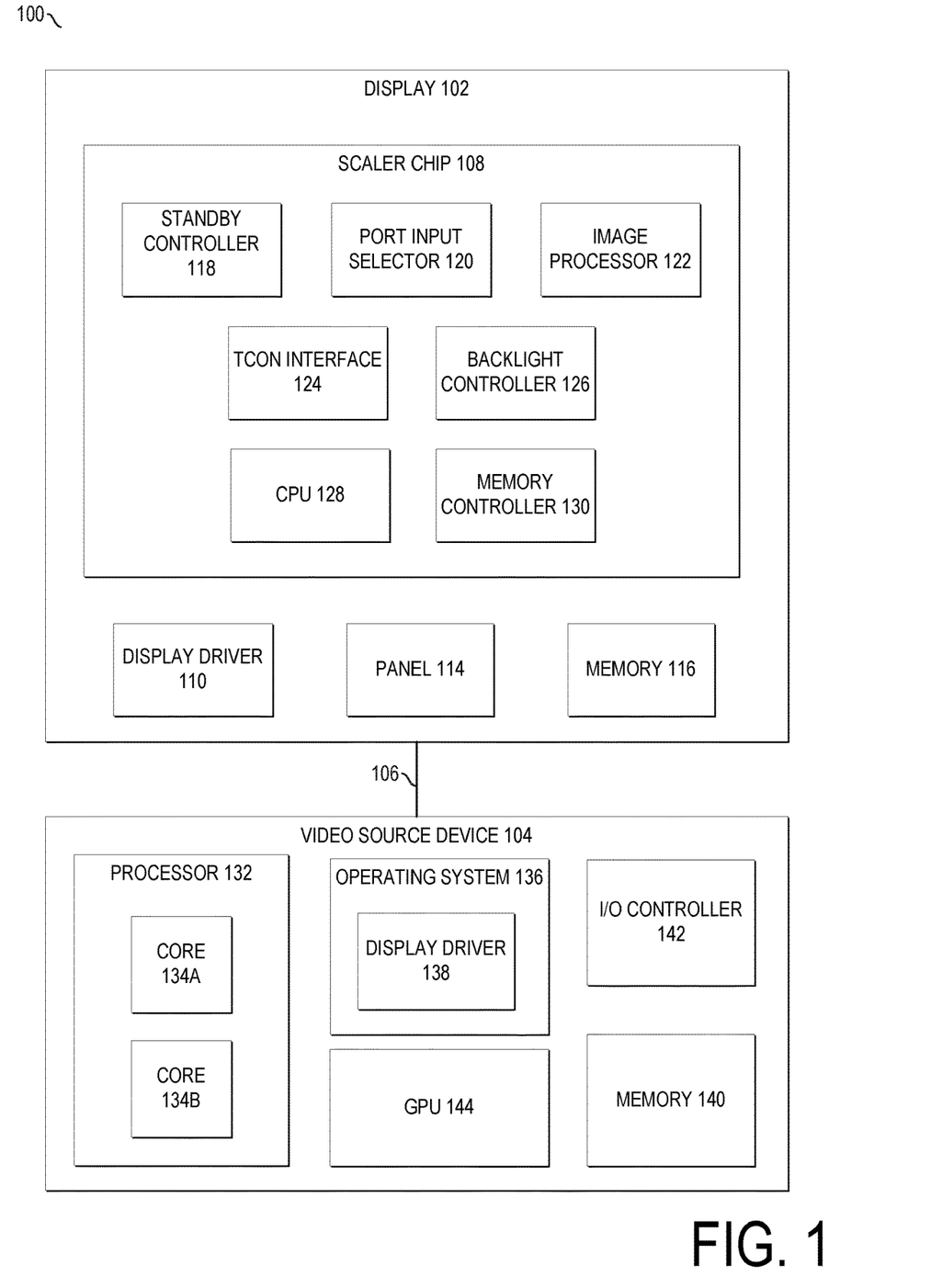
FIG. 1 illustrates a block diagram of a computing system implementing enhanced display wakeup in accordance with certain embodiments.

FIG. 1 illustrates a block diagram of a computing system 100 implementing enhanced display wakeup in accordance with certain embodiments. Computing system 100 comprises a display 102 coupled to a video source device 104 (also referred to herein as a "display source" or "source") via a link 106.

In various computing systems, when a display (e.g., a computer monitor) is powered up, the display may continuously scan all of its ports to detect whether there is traffic (e.g., over sideband message channels) over any of the ports. Such traffic allows the display to detect a video source device (e.g., a computing device) initiating a video connection. This full port scan may be carried out through a round-robin poll on all of the ports. Continuously polling on the ports (and spending multiple seconds polling each port), results in an excruciatingly slow display bring-up on exit from a standby mode (e.g., about 10 seconds in many instances). Consequently, consumers may perceive the wakeup process of a desktop computer to be very slow, especially when compared to the wakeup time of phones or laptops, which generally resume from sleep in under 500 ms.

Various embodiments of the present disclosure provide a display 102 with a standby controller 118 to implement a fast port scan procedure which enables a quick display bring up on exit from standby, where bring up entails the procedure performed to cause the display 102 to display a video signal from the video source device 104. In order to perform a fast scan upon exit from standby, a video source presence detection capability in the display 102 is used to identify the ports which have a physical connection to a display source (e.g., video source device 104). Instead of scanning all ports of the display 102 to check for communication traffic, only the port or ports that have a physical connection will be scanned. The display 102 then attempts to establish a connection via only those connected port(s). Such embodiments avoid the delay caused by the polling of ports that are not physically connected to a display source.

Some embodiments further enhance display wakeup using a context retention scheme in which the standby controller 118 of the display 102 stores connection attributes of a connection to a video source device 104 when the video source device enters a standby mode. If the display 102 remains physically connected to this video source device 104, the display 102 will restore the connection attributes when the video source device exits standby to speed up the bring-up process. Various embodiments may provide any one or more technical advantages, such as reducing the bring up time on exit from standby for external displays and reducing power usage during bring up.

Display 102 may be any suitable display device (e.g., a computer monitor, television, etc.) that may couple to a video source device (e.g., 104) to display a representation of a video signal received from the video source device.

In the embodiment depicted, display 102 comprises a scaler chip 108, a display driver 110, a panel 114, and a memory 116. Other embodiments may include a display with any suitable combination of components (including any of those shown or other components).

Scaler chip 108 includes standby controller 118, port input selector 120, image processor 122, timing controller (TCON) interface 124, backlight controller 126, central processing unit (CPU) 128, and memory controller 130.

Standby controller 118 is operable to manage operations associated with entry into standby and exit from standby for the display 102. For example, the standby controller 118 may coordinate the fast scan procedure described herein, the context save and restore procedure, or the entry into and exit from standby for the display 102. In various embodiments, standby controller 118 may coordinate with other components of display 102 to achieve the functions described herein. In some embodiments, all or a portion of standby controller 118 may be integrated within another component of the scaler chip 108, such as the port input selector 120 or CPU 128; or other component of the display 102. Thus, in some embodiments the standby controller 118 may be a distinct logic component or may include a collection of logic from various components of the scaler chip 108 (or other components of the display 102).

Port input selector 120 is operable to select a port from among a plurality of ports of the display 102 and to pass a video signal received through the port to a processing pipeline of the display 102. The port input selector 120 may include a port interface that comprises or is coupled to a plurality of ports of the display. The display 102 may include any number of ports of any type. For example, display 102 may include a DisplayPort™ port, a High-Definition Multimedia Interface (HDMI™) port, a Universal Serial Bus (USB) port, a Digital Visual Interface (DVI) port, a Video Graphics Array (VGA) port, or other suitable port. Display 102 may include any suitable combination of ports, including multiple ports of the same type or multiple ports of different types. The port input selector 120 may include selection logic coupled to the port interface to select a particular port and to pass the signal received through the particular port on to additional logic (e.g., the standby controller 118, the image processor 122, etc.). In some embodiments, the port input selector 120 may also include conversion logic to receive a signal from any of the ports of the display 102 and convert the signal to a common format (e.g., a digital pixel format) for further processing.

Image processor 122 may receive a video signal from the port input selector 120 and perform further processing on the video signal. In some embodiments, the image processor 122 may execute one or more algorithms to improve the image quality of the video signal. For example, image processor 122 may perform resolution upscaling, contrast adjustment, color adjustment, or other suitable image processing. In some embodiments, image processor 122 may superimpose one or more images (e.g., a user menu of the display 102) on the video signal.

TCON interface 124 may receive a processed signal from image processor 122 and convert the signal to a format (e.g., a serial high speed interface format such as Embedded DisplayPort™ (eDP) or V-by-One®) compatible with a TCON of the display driver 110.

Backlight controller 126 may include a backlight driver and may generate signals that may be used by the backlight driver to produce current to light up the panel 114.

CPU 128 may provide various functions of the display 102. For example, the CPU 128 may manage the on screen display and user configuration adjustments of the display 102. The CPU 128 may communicate with other components of the display 102 (e.g., to bring up a menu or change the brightness of the display in response to a user selection).

Memory controller 130 may control the transfer of data between one or more components of the scaler chip 108 and the memory 116. Memory 116 may include any suitable volatile or non-volatile memory to support the operations of the display 102. For example, the memory 116 may be used to store instructions executed by the components (e.g., CPU 128, standby controller 118, image processor 122, or other component), frame data (e.g., values of pixels), on-screen display data, or other suitable data. In some embodiments, memory 116 may comprise multiple different memory modules (e.g., each of which may be dedicated to particular types of data) located on any one or more components of the display 102. For example, in various embodiments, the scaler chip 108 may include one or more memory modules to support the operation of the scaler chip 108.

Display driver 110 may comprise circuitry to receive a video signal and to drive electrical signals to the display elements of the panel 114 to cause the panel 114 to display the video. In a particular embodiment, display driver may comprise a TCON. In a particular embodiment, display driver 110 comprises one or more row and column drivers to drive the display elements. The display driver 110 may include one or more digital to analog converters (DACs) to produce the appropriate currents to drive the display elements.

In various embodiments, panel 114 may generate light or allow for the transmission of light in a plurality of pixels. Panel 114 may comprise a display substrate on which a plurality of pixels are located. The pixels define a display area within which a video signal comprising still images, videos, or other content defined by a video signal can be displayed. Panel 114 may utilize any suitable display technology, such as, e.g., a thin-film-transistor liquid crystal display (TFT LCD), micro-light emitting diode (micro-LED), organic LED (OLED), quantum dot LED (QLED), or other suitable display technology.

The components of the display 102 may be arranged in any suitable manner. In one embodiment, a first printed circuit board may comprise the scaler chip 108 and a second printed circuit board may comprise the display driver 110 (in some embodiments a separate printed circuit board may house the TCON). In some embodiments, memory 116 or a portion thereof may be included on the first printed circuit board (or integrated on the scaler chip 108).

Video source device 104 may be any suitable computing device to communicate a video signal to the display 102. For example, video source device 104 may be a desktop computing system, a laptop computing system, a server computing system, a storage system, a handheld device, a tablet, or other suitable computing device.

In the embodiment depicted, video source device 104 comprises processor 132, operating system 136 (which may be executed by processor 132), memory 140, I/O controller 142, and graphics processing unit (GPU) 144. Processor 132 is depicted as including two processing cores 134A and 134B, though the processor 132 may include any suitable number of cores.

The operating system 136 may execute a display driver 138 that controls the connection from the video source device 104 over the link 106 to the display 102 and the communication of the video signal (and supporting communications) over the connection.

The GPU 144 may generate the video signal that is communicated to the display 102. In the embodiment depicted, the GPU 144 is a discrete component, though in other embodiments, the GPU 144 may be integrated with processor 132.

Memory 140 may include any suitable volatile or non-volatile memory to support the operations of the display 102. The memory 140 may be used to store instructions executed by the components (e.g., processor 132 or GPU 144), or other suitable data. In some embodiments, memory 140 may comprise multiple different memory modules (e.g., each of which may be dedicated to particular types of data) located on any one or more components of the display video source device 104. In some embodiments, memory 140 may comprise a system memory.

Link 106 may comprise any suitable transmission medium operable to communicate analog or digital data between the display 102 and the video source device 104. In some embodiments, link 106 may comprise a cable with a connector on each end. For example, link 106 may comprise a DisplayPort™ cable, an HDMI' cable, a USB cable, a DVI cable, a VGA cable, or other suitable cable.

Figure 2:
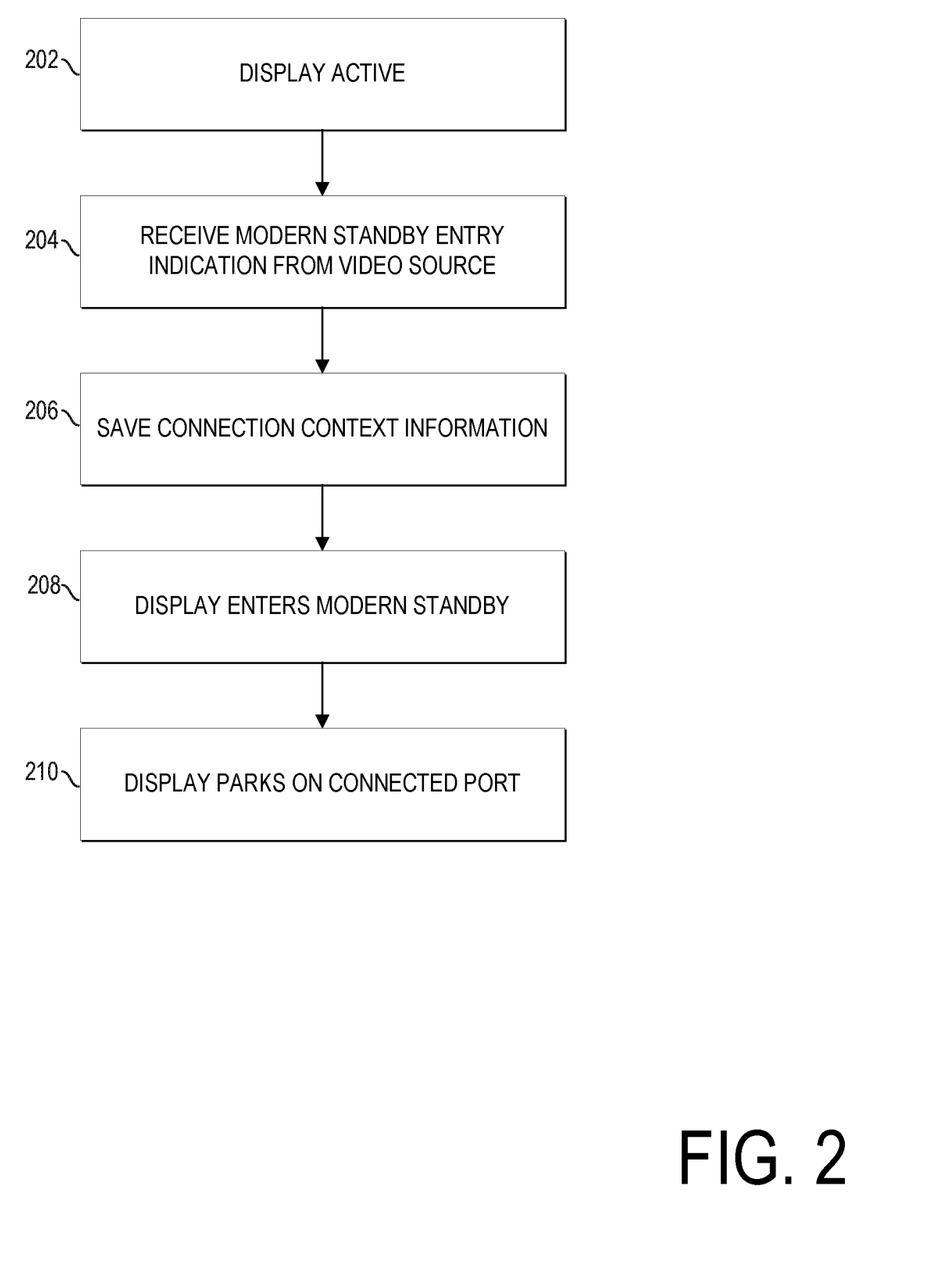
FIG. 2 illustrates a flow for standby entry by a display in accordance with certain embodiments.

FIG. 2 illustrates a flow for standby entry by a display 102 in accordance with certain embodiments. Various embodiments of the present disclosure contemplate operations associated with a standby mode known as "Modern Standby." Modern Standby is a standby mode implemented by some computing systems utilizing Microsoft Windows operating systems. Various features of Modern Standby are described below. The present disclosure contemplates embodiments in which other standby modes may be used in addition to or in the place of Modern Standby. Accordingly, any of the description herein associated with Modern Standby may apply to other modes of standby and the various embodiments of the present disclosure may be utilized with any suitable standby mode.

Modern Standby is a low power standby mode encompassing multiple hardware and software power states (which may occur with the display turned off). Modern Standby may be entered based on any suitable trigger, such as a press of a power button of the video source device 104, expiration of an idle timer, or a selection of a sleep mode from a menu. In some embodiments, before entering Modern Standby, all software activity (or as much activity as possible) may be stopped and components of the processor (e.g., 132) may be put into low-power states (in some embodiments components off chip may also be put into low-power states). In some configurations, one or more components may stay awake to perform background processing while the remainder of the components are powered off (or are otherwise kept in a low power state). A video source device (e.g., 104) in Modern Standby may continue to listen for wakeup events (e.g., a particular network packet, user input at a keyboard, the press of a power button, indication of an operating system update, etc.) and may exit Modern Standby upon such a wakeup event.

The flow of FIG. 2 depicts behavior of display 102 when a video source device 104 enters Modern Standby. At 202, the display is active. While active, display 102 may display a representation of a video signal received from the video source device 104 over link 106. At 204, the display 102 receives an indication over the link 106 from the video source device 104 that the video source device 104 is going to enter Modern Standby. Prior to turning off the connection over link 106 and entering Modern Standby, the video source device 104 provides this indication to the display 102. This indication may prompt the display 102 to itself initiate entry into a Modern Standby state (e.g., a low power state compatible with the Modern Standby state of the video source device 104).

Before going into Modern Standby, the display 102 saves context information associated with the connection between the display 102 and the video source device 104 at 206. This context information may allow the display 102 to display a video signal from the video source device 104 more quickly when the video source device 104 exits Modern Standby and becomes active again. Any suitable context information associated with the connection between the display 102 and the video source device 104 may be stored by the display 102, such as information obtained during an initial link training on the link 106 between the display 102 and the video source device 104 (e.g., number of lanes, link rate, voltage swing values, pre-emphasis parameters, equalization parameters, or other suitable information) or other configuration information (e.g., last resolution enabled, color format, color depth, panel scaling configuration, etc.). The context information may be stored in the memory 116 (or other suitable memory of the display, such as memory on the scaler chip 108).

At 208, the display enters Modern Standby. While the display is in Modern Standby, the display may power off various components of the display 102 (e.g., panel 114, display driver 110, TCON interface 124, backlight controller 126, image processor 122, or other suitable components). In Modern Standby, the display may maintain one or more components (including any of the above components or other components, such as the standby controller 118, port input selector 120, or CPU 128) in a low power state in order to allow the performance of particular functions. For example, while in Modern Standby, the status of the ports of the display 102 may be monitored (e.g., periodically) or detected in response to a trigger, e.g., a connector being plugged into or removed from a port of the display 102. The display 102 will also maintain a configuration flag (e.g., one or more bits) that reflect the current Modern Standby state of the display 102. For example, the configuration flag may be set when the display 102 has been put into Modern Standby responsive to the Modern Standby entry indication received from the video source device 104 and reset when the display 102 is no longer in Modern Standby. This configuration flag is stored in a memory of the display 102 that is readable over the link 106 by the video source device 104 so that the video source device 104 may ascertain the live Modern Standby status of the display 102. The configuration flag may be referred to herein as a Modern Standby status flag.

While in Modern Standby, the display 102 parks on the connected port (e.g., the port that is coupled to link 106 through which the standby entry indication was received) of the display at 210. Parking on a port may include a periodic scan of traffic at that port to determine if the source is exiting Modern Standby while quiescing the scanning of the other ports (such that only the connected port is scanned). For example, the display 102 may scan the port to determine if a Resume-From-Modern-Standby exit signal or some other signal instructing exit from standby (or other signal initiating display bring up) is being transmitted by the video source device 104. In various embodiments, the scanning may look for such a signal on a sideband channel. In various embodiments, the sideband channel may be a channel that does not carry the video signal and/or a channel that is used for capability discovery and link configuration. Sometimes the sideband channel may be referred to as an auxiliary (AUX) channel. In various embodiments, the sideband channel may communicate data without being trained, whereas the main channel requires training before carrying the video signal. In alternative embodiments, the scanning may look for the display bring up signal on the main channel (e.g., the channel used to carry the video signal). Such a mode in which the display 102 parks on a connect port while in Modern Standby may be referred to herein as a fast scan Modern Standby mode.

The fast scan Modern Standby mode may be contrasted with a mode in which a display only monitors the sideband channel of one connector at a time and rotates through the sideband channels of multiple ports looking for a display bring up signal (e.g., a standby exit signal). In such a mode, a video source device may exit standby while the display is polling ports that are not connected to the video source device, thus resulting in unnecessary delay before the display scans the port coupled to the video source device and detects the display bring up signal from the video source device.

As will be described in further detail below, after a display bring up signal (e.g., standby exit signal) is sent from the video source device 104 to the display 102, the video stream and link configuration context is restored, a standard or fast (e.g., with no handshaking) link training is performed, and then the video signal transmission from the video source device 104 to the display 102 may resume.

In some embodiments, while a display 102 is parking on a particular port, the display 102 may be able to detect a plug in on another port (or on the particular port, e.g., if the link 106 is disconnected and then connected again), even though the display 102 is not actively scanning the port.

Figure 3:
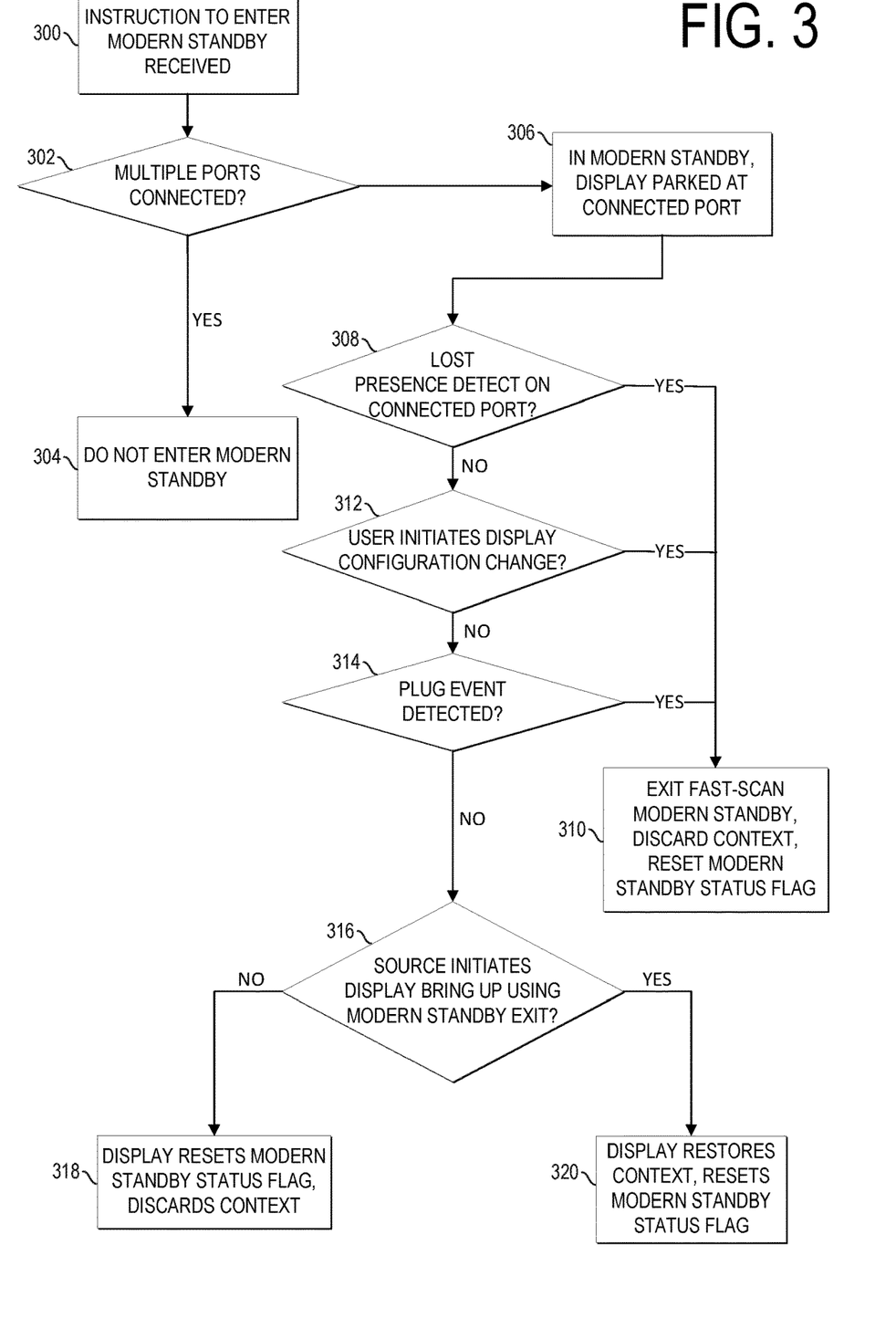
FIG. 3 illustrates a flow for behavior of a display in standby in accordance with certain embodiments.

FIG. 3 illustrates a flow for behavior of a display 102 in standby (e.g., Modern Standby) in accordance with certain embodiments. The flow begins at 300 where an instruction to enter Modern Standby is received from the video source device 104. This instruction may be, e.g., an indication from the video source device 104 that the video source device 104 is going to enter Modern Standby. At 302 a determination is made as to whether multiple ports of the display have connections to video source devices. If multiple connections are present, the display 102 does not enter Modern Standby. If only a single connection (to the video source device 104) is present, then the display enters Modern Standby and is parked at the connected port. In this state, a number of triggers may cause the display 102 to exit Modern Standby. The manner in which the display 102 exits Modern Standby may be based on which type of trigger is detected.

At 308, if presence detection on the connected port is lost (e.g., the video source device is physically disconnected from the port), then the display 102 exits fast-scan Modern Standby at 310. The display 102 also discards the saved context information associated with the connection over the link 106 to the (now disconnected) video source device 104. The display 102 may also clear its Modern Standby status flag to indicate that the display 102 is no longer in Modern Standby.

Similarly, if a user-initiated configuration change on the display 102 is detected at 312 (e.g., a mechanical or touch-screen button (e.g., on the on screen display) of the display 102 is pressed), then the display exits the Modern Standby state, discards the context, and resets its Modern Standby status flag at 306. Such embodiments may provide protection against errors and may basically provide a reset function for the display 102. For example, if the display 102 is locked by error into a Modern Standby state, then the press of an on screen display button would allow for exit from the Modern Standby state. Similarly, if a video source device fails to initiate a hot plug event, then an on screen display button press may allow for exit from the Modern Standby state.

Similarly, if a plug event is detected at 314 (e.g. if a new video source device is connected to the display 102), then the display 102 exits the Modern Standby state, discards the context information, and resets its Modern Standby status flag at 310.

If none of the triggers are encountered before the video source device 104 initiates display bring up, then at the time that the video source device 104 initiates a display bring up, a determination is made at 314 as to whether the video source device 104 is using a Modern Standby exit signal (or an exit signal matching the standby mode if other standby mode is used in place of Modern Standby) to initiate the display bring up (as use of the Modern standby exit signal indicates that the same device that put the display 102 to sleep is now waking up the display 102 and thus the context may be reused whereas a different type of exit from Modern Standby is a bad-path case which should result in the default slower display resume path in which all ports are scanned). If a Modern Standby exit signal is not used to initiate the display bring up, then the display 102 resets its Modern Standby status flag and discards the context information associated with the connection at 318 (and may subsequently undergo additional link training to determine new context information). If the Modern Standby exit signal is used by the video source device 104 to initiate the display bring up, then the display 102 restores the context information at 320 for use in communicating with the video source device 104. At 320, the display may also reset the Modern Standby status flag.

As described in connection with FIG. 4, the video source device 104 may also restore context information associated with the connection over the link 106 such that communication of a video signal from the video source device 104 to the display 102 may resume more quickly than a situation in which the context information is not stored or is discarded and the connection between the video source device 104 and the display 102 is treated as a new connection. In one embodiment, when the context information is restored, an initial configuration discovery and handshake procedure may be bypassed. For example, the Extended Display Identification Data (EDID) (a data structure that describes the capabilities of the display, such as the manufacturer, serial number, supported resolutions, refresh rates, clock speeds, color spaces, etc.) read (or similar data structure read) performed by the video source device 104 that occurred at the time of establishment of the connection may be omitted when the connection is restored. As another example, the link training pre-emphasis and voltage swing values may be restored and do not need to be redetermined. In some embodiments, because these values may be restored upon exit from Modern Standby, the link 106 may be trained with a closed loop no handshake link training (e.g., as defined in the DisplayPort standard) that is faster (in some embodiments much faster) than the link training that occurs at initial establishment of the connection. For example, a closed loop link training that does not utilize sideband communication (and hence does not include software interaction) may be used. In various embodiments, such link trainings may include any suitable type of fast link training or no-AUX link training at Ultra High Bit Rate (UHBR)* frequencies. The link training could alternatively include any suitable training that reuses parameters obtained from an initial link training.

Figure 4:
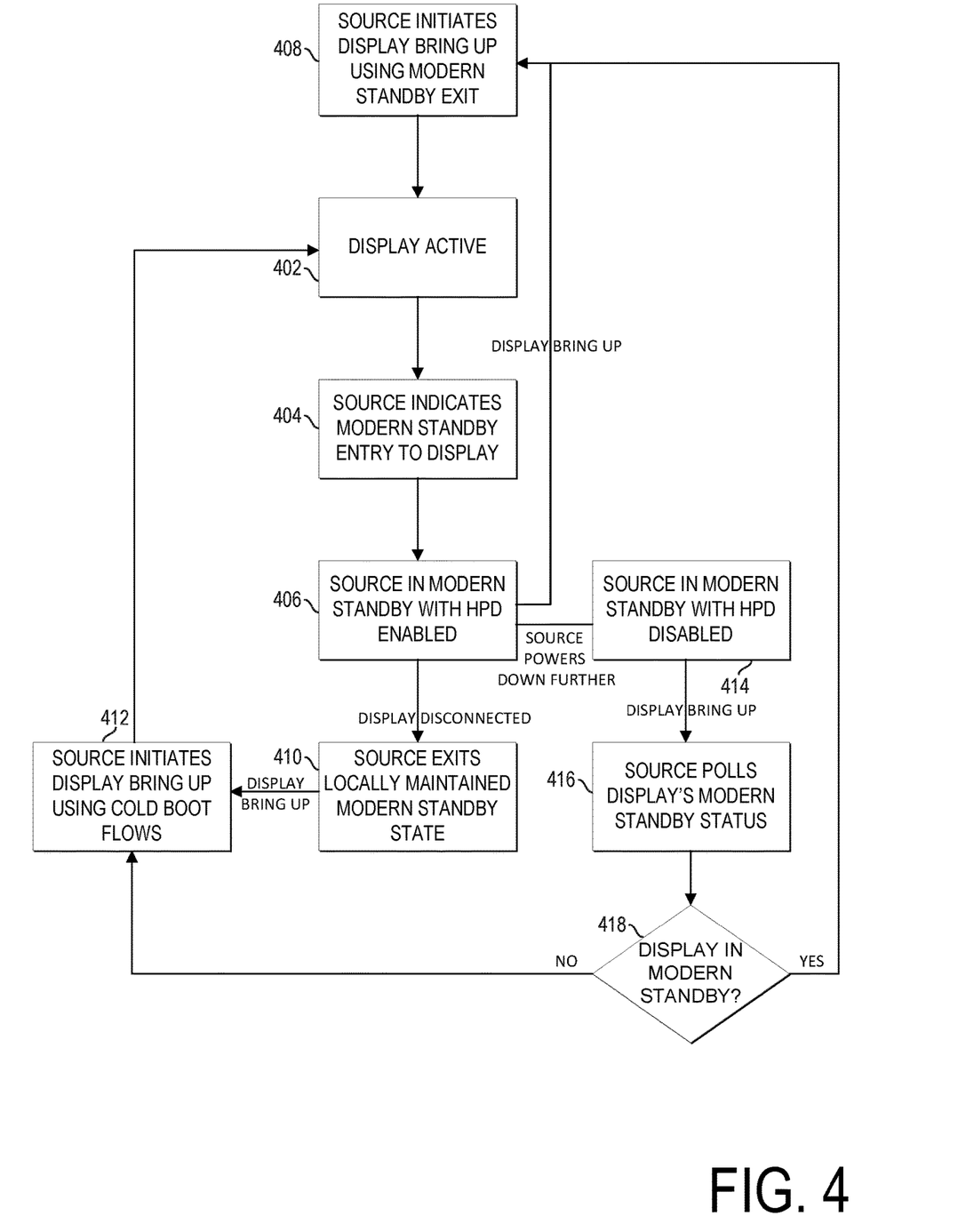
FIG. 4 illustrates a flow for behavior of a video source device utilizing a standby mode in accordance with certain embodiments.

FIG. 4 illustrates a flow for behavior of a video source device 104 utilizing a standby mode (e.g., Modern Standby) in accordance with certain embodiments. At 402, a display 102 coupled to the video source device 104 is active (e.g., is displaying a representation of a video signal of the video source device 104). At 404, the video source device 104 initiates entry into Modern Standby and sends an indication of such to the display 102.

When the video source device 104 initiates entry into Modern Standby, it may also store context information associated with the connection to the display 102, such as configuration information (e.g., information in the EDID) or link training information (such as any of the information described above).

The video source device 104 may then enter Modern Standby with hot plug detection (HPD) enabled. HPD may refer to the ability to plug a display into a source while both are powered on and may be initiated when a particular pin (e.g., the HPD pin of a connector coupled to link 106) makes contact with a corresponding port of the display 102 or video source device 104. When HPD is enabled for a device (e.g., video source device 104), the device may be able to detect a plug event (e.g., an unplugging or plugging in of a connector), while the device may not be able to detect a plug event when HPD is disabled.

If the video source device 104 determines to bring up the display 102 while in Modern Standby with HPD enabled, then the flow moves to 408, where the video source device 104 initiates display bring up using Modern Standby exit (e.g., by sending a Resume-From-Modern-Standby exit signal to the display 102) and the display 102 becomes active again at 402. As part of this process, the operating system 136 of the video source device 104 may restore the context information on the display driver 138. In various embodiments, the context information could be stored by the operating system 136 at any suitable time (e.g., during or after initial link training, before the video source device 104 enters Modern Standby, etc.) in memory 140 (e.g., a system memory comprising DRAM or other suitable memory) shared by the processor 132 and the GPU 144 in a typical integrated CPU/GPU implementation or in a separate memory (e.g., VRAM) in a discrete graphics implementation) and may be retrieved and stored along with other information utilized by the display driver 138. When the display 102 is initially connected to video source device 104, the display driver 138 may read the EDID and pass this information to the operating system 136 as part of a capability discovery flow. The operating system 136 may then instruct the display driver 138 which display configurations to set up. These steps may be skipped in various embodiments when the video source device 104 resumes operation from Modern Standby by retrieving the context information of the configuration that was enabled prior to Modern Standby entry.

While the video source device 104 is in Modern Standby with HPD enabled, if the video source device 104 detects that the display 102 has been disconnected, then the video source device 104 exits Modern Standby at 410 and then initiates display bring up using cold boot flows at 412. The cold boot flows may be the same (or similar to) flows that are performed when the video source device 104 initially connects with the display 102. Thus, the link context information may be discarded and new link context information is obtained as the connection is reestablished. The display is then activated again at 402.

At 406, after a period of time has elapsed (or in response to a trigger), the video source device 104 may power down further and enter a deep low power state in which plug event (e.g., HPD event) detection capability is disabled at 414. Accordingly, if the operational or connection state of the display 102 changes while the video source device 104 is in such a state, the video source device 104 may be unaware of the change. When the video source device 104 determines to initiate display bring up, the video source device 104 may poll the Modern Standby status of the display 102 (e.g., by checking the Modern Standby status flag) at 416.

At 418, a determination is made as to whether the display 102 is in the Modern Standby state (e.g., based on the value of the Modern Standby status flag). If the display 102 is in the Modern Standby state, the flow moves to 408 where the video source device 104 initiates display bring up using Modern Standby exit in which the connection context information is restored and the display is quickly brought up and is activated again at 402. If the display 102 is not in the Modern Standby state, the flow moves to 412, where the video source device 104 initiates display bring up using cold boot flows.

The flow above may be adapted to any suitable video source device architecture. For example, if the standby mode of the device 104 does not support HPD during standby, then 406 may be omitted and the flow may be modified accordingly (e.g., by moving from 404 to 414 directly). As another example, if the standby mode of the device 104 does not support disabling HPD during standby, then 414, 416, and 418 may be omitted.

Similar features to those described above between the display 102 and the video source device 104 may be applied to branch devices. A branch device may be connected between the video source device 104 and the display 102 (or may be located on the video source device 104 itself in the communication path after a video signal generated by the device 104 but before the video signal leaves the device 104). For example, in some embodiments, the video source device 104 may multiplex multiple video signals together (e.g., using Multi-Stream Transport as defined in a DisplayPort™ standard) and send the multiplexed video signals to a branch device. The branch device may then demultiplex the combined signals into their original video signals and provide the original video signals to input ports of one or more displays.

A branch device may snoop a sideband transaction (e.g., on an auxiliary channel that does not carry the video signal) to determine when the video source device 104 is entering or exiting Modern Standby. The branch device may store context information of its link to the video source device 104 or display 102 locally upon Modern Standby entry. For example, this context information may include any suitable context information such as that described above (e.g., pre-emphasis/swing and preset values) such that on exit from Modern Standby, the link training can be much faster (e.g., closed loop link training may be applied). In one embodiment, a DisplayPort™ MST branch device may restore a Payload Bandwidth Number (PBN) configuration and the Virtual Channel (VC) payload allocation on Modern Standby exit without having to go through the BW re-establishment. This mechanism may be used to be used to configure bandwidth in a Multi-Stream Transport configuration, where there are multiple streams time multiplexed over the same link.

The flows described in FIGS. 2-4 are merely representative of operations or communications that may occur in particular embodiments. In other embodiments, additional operations or communications may be performed in the flows. Various embodiments of the present disclosure contemplate any suitable signaling mechanisms for accomplishing the functions described herein. Some of the operations illustrated in FIGS. 2-4 may be repeated, combined, modified, or deleted where appropriate. Additionally, operations may be performed in any suitable order without departing from the scope of particular embodiments.

Figure 5:
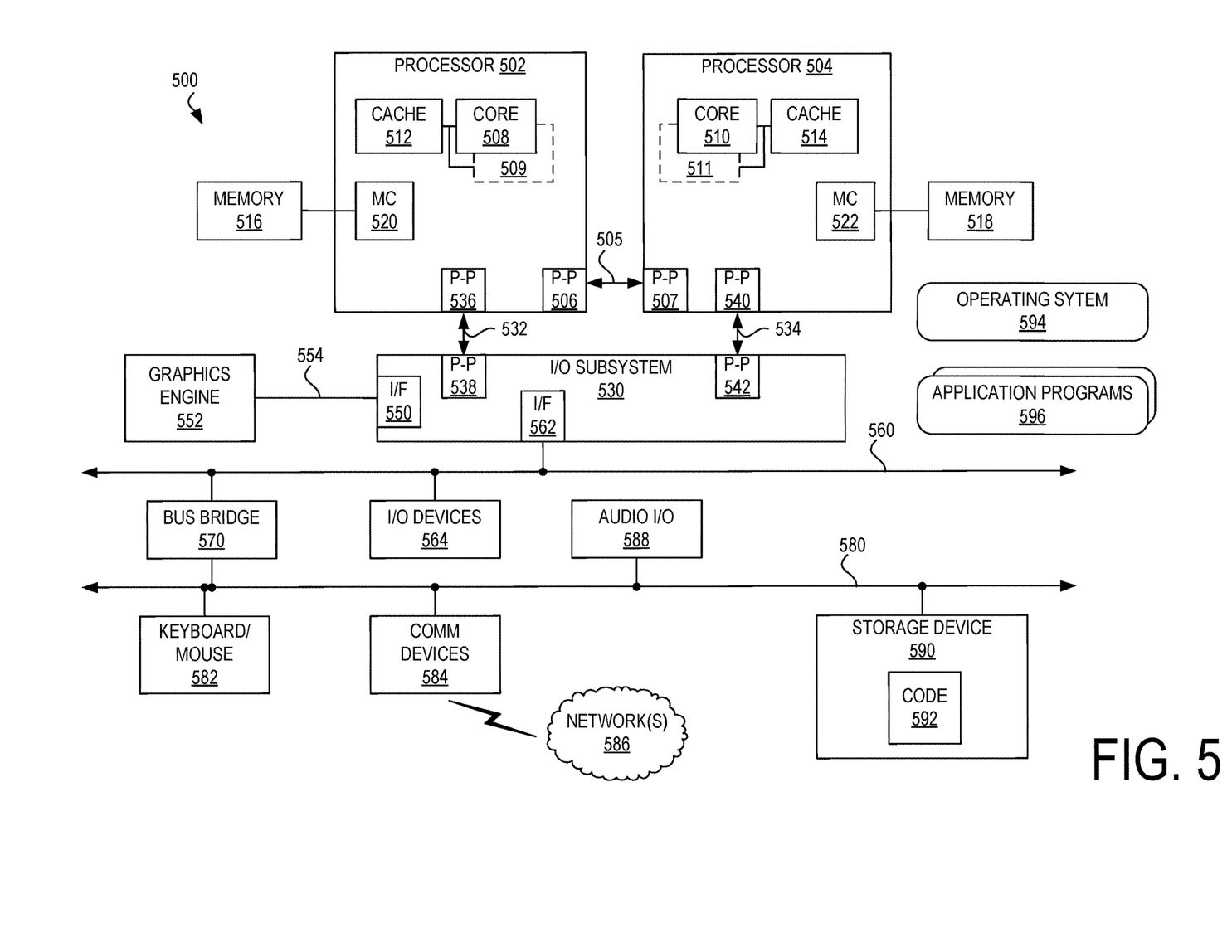
FIG. 5 is a block diagram of a computing system in which technologies described herein may be implemented in accordance with certain embodiments.

FIG. 5 is a block diagram of a computing device in which technologies described herein may be implemented in accordance with certain embodiments (e.g., the video source device 104 may include any of the characteristics or components of the computing device of FIG. 5). The technologies, techniques, and embodiments described herein can be performed by any of a variety of computing devices, including mobile devices (e.g., smartphones, handheld computers, laptops, notebooks, tablets, media players, portable gaming consoles, cameras), non-mobile devices (e.g., desktop computers, servers, stationary gaming consoles, set-top boxes, televisions) and embedded devices (e.g., devices incorporated into a vehicle, home or place of business). As used herein, the term "computing devices" includes computing systems and includes devices comprising multiple discrete physical components.

FIG. 5 is a block diagram of an exemplary computing device in which technologies described herein may be implemented. Generally, components shown in FIG. 5 can communicate with other shown components, although not all connections are shown, for ease of illustration. The device 500 is a multiprocessor system comprising a first processor 502 and a second processor 504 and is illustrated as comprising point-to-point (P-P) interconnects. For example, a point-to-point (P-P) interface 506 of the processor 502 is coupled to a point-to-point interface 507 of the processor 504 via a point-to-point interconnection 505. It is to be understood that any or all of the point-to-point interconnects illustrated in FIG. 5 can be alternatively implemented as a multi-drop bus, and that any or all buses illustrated in FIG. 5 could be replaced by point-to-point interconnects.

As shown in FIG. 5, the processors 502 and 504 are multicore processors. Processor 502 comprises processor cores 508 and 509, and processor 504 comprises processor cores 510 and 511. Processor cores 508-511 can execute computer-executable instructions in a manner similar to that discussed below in connection with FIG. 6, or in other manners.

Processors 502 and 504 further comprise at least one shared cache memory 512 and 514, respectively. The shared caches 512 and 514 can store data (e.g., instructions) utilized by one or more components of the processor, such as the processor cores 508-509 and 510-511. The shared caches 512 and 514 can be part of a memory hierarchy for the device 500. For example, the shared cache 512 can locally store data that is also stored in a memory 516 to allow for faster access to the data by components of the processor 502. In some embodiments, the shared caches 512 and 514 can comprise multiple cache layers, such as level 1 (L1), level 2 (L2), level 3 (L3), level 4 (L4), and/or other caches or cache layers, such as a last level cache (LLC).

Although the device 500 is shown with two processors, the device 500 can comprise any number of processors. Further, a processor can comprise any number of processor cores. A processor can take various forms such as a central processing unit, a controller, a graphics processor, an accelerator (such as a graphics accelerator or digital signal processor (DSP)) or a field programmable gate array (FPGA). A processor in a device can be the same as or different from other processors in the device. In some embodiments, the device 500 can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 502 and 504 reside in the same die package.

Processors 502 and 504 further comprise memory controller logic (MC) 520 and 522. As shown in FIG. 5, MCs 520 and 522 control memories 516 and 518 coupled to the processors 502 and 504, respectively. The memories 516 and 518 can comprise various types of memories, such as volatile memory (e.g., dynamic random access memories (DRAM), static random access memory (SRAM)) or non-volatile memory (e.g., flash memory). While MCs 520 and 522 are illustrated as being integrated into the processors 502 and 504, in alternative embodiments, the MCs can be logic external to a processor and can comprise one or more layers of a memory hierarchy.

Processors 502 and 504 are coupled to an Input/Output (I/O) subsystem 530 via P-P interconnections 532 and 534. The point-to-point interconnection 532 connects a point-to-point interface 536 of the processor 502 with a point-to-point interface 538 of the I/O subsystem 530, and the point-to-point interconnection 534 connects a point-to-point interface 540 of the processor 504 with a point-to-point interface 542 of the I/O subsystem 530. Input/Output subsystem 530 further includes an interface 550 to couple I/O subsystem 530 to a graphics engine 552, which can be a high-performance graphics engine. The I/O subsystem 530 and the graphics engine 552 are coupled via a bus 554. Alternately, the bus 554 could be a point-to-point interconnection.

Input/Output subsystem 530 is further coupled to a first bus 560 via an interface 562. The first bus 560 can be a Peripheral Component Interconnect (PCI) bus, a PCI Express bus, another third generation I/O interconnection bus or any other type of bus.

Various I/O devices 564 can be coupled to the first bus 560. A bus bridge 570 can couple the first bus 560 to a second bus 580. In some embodiments, the second bus 580 can be a low pin count (LPC) bus. Various devices can be coupled to the second bus 580 including, for example, a keyboard/mouse 582, audio I/O devices 588 and a storage device 590, such as a hard disk drive, solid-state drive or other storage devices for storing computer-executable instructions (code) 592. The code 592 can comprise computer-executable instructions for performing technologies described herein. Additional components that can be coupled to the second bus 580 include communication device(s) 584, which can provide for communication between the device 500 and one or more wired or wireless networks 586 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

The device 500 can comprise removable memory such as flash memory cards (e.g., SD (Secure Digital) cards), memory sticks, Subscriber Identity Module (SIM) cards). The memory in device 500 (including caches 512 and 514, memories 516 and 518 and storage device 590) can store data and/or computer-executable instructions for executing an operating system 594 and application programs 596. Example data includes web pages, text messages, images, sound files, video data, biometric thresholds for particular users or other data sets to be sent to and/or received from one or more network servers or other devices by the device 500 via one or more wired or wireless networks, or for use by the device 500. The device 500 can also have access to external memory (not shown) such as external hard drives or cloud-based storage.

The operating system 594 can control the allocation and usage of the components illustrated in FIG. 5 and support one or more application programs 596. The application programs 596 can include common mobile computing device applications (e.g., email applications, calendars, contact managers, web browsers, messaging applications) as well as other computing applications and utilities, such as a virtual keyboard.

The device 500 can support various input devices, such as a touchscreen, microphones, camera, physical keyboard, virtual keyboard, proximity sensor and trackball, and one or more output devices, such as a speaker and a display. Other possible input and output devices include piezoelectric and other haptic I/O devices. Any of the input or output devices can be internal to, external to or removably attachable with the device 500. External input and output devices can communicate with the device 500 via wired or wireless connections.

In addition, the computing device 500 can provide one or more natural user interfaces (NUIs). For example, the operating system 594 or applications 596 can comprise speech recognition logic as part of a voice user interface that allows a user to operate the device 500 via voice commands. Further, the device 500 can comprise input devices and logic that allows a user to interact with the device 500 via a body, hand, or face gestures. For example, a user's hand gestures can be detected and interpreted to provide input to a gaming application.

The device 500 can further comprise one or more communication components 584. The components 584 can comprise wireless communication components coupled to one or more antennas to support communication between the device 500 and external devices. The wireless communication components can support various wireless communication protocols and technologies such as Near Field Communication (NFC), Wi-Fi, Bluetooth, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device 500 can further include at least one input/output port (which can be, for example, a USB, IEEE 1394 (FireWire), Ethernet and/or RS-232 port) comprising physical connectors; a power supply; a satellite navigation system receiver, such as a GPS receiver; a gyroscope; an accelerometer; a proximity sensor; and a compass. A GPS receiver can be coupled to a GPS antenna. The device 500 can further include one or more additional antennas coupled to one or more additional receivers, transmitters and/or transceivers to enable additional functions.

It is to be understood that FIG. 5 illustrates only one exemplary computing device architecture. Computing devices based on alternative architectures can be used to implement technologies described herein. For example, instead of the processors 502 and 504, and the graphics engine 552 being located on discrete integrated circuits, a computing device can comprise an SoC (system-on-a-chip) integrated circuit incorporating multiple processors, a graphics engine and additional components. Further, a computing device can connect elements via bus or point-to-point configurations different from that shown in FIG. 5. Moreover, the illustrated components in FIG. 5 are not required or all-inclusive, as shown components can be removed and other components added in alternative embodiments.

Figure 6:
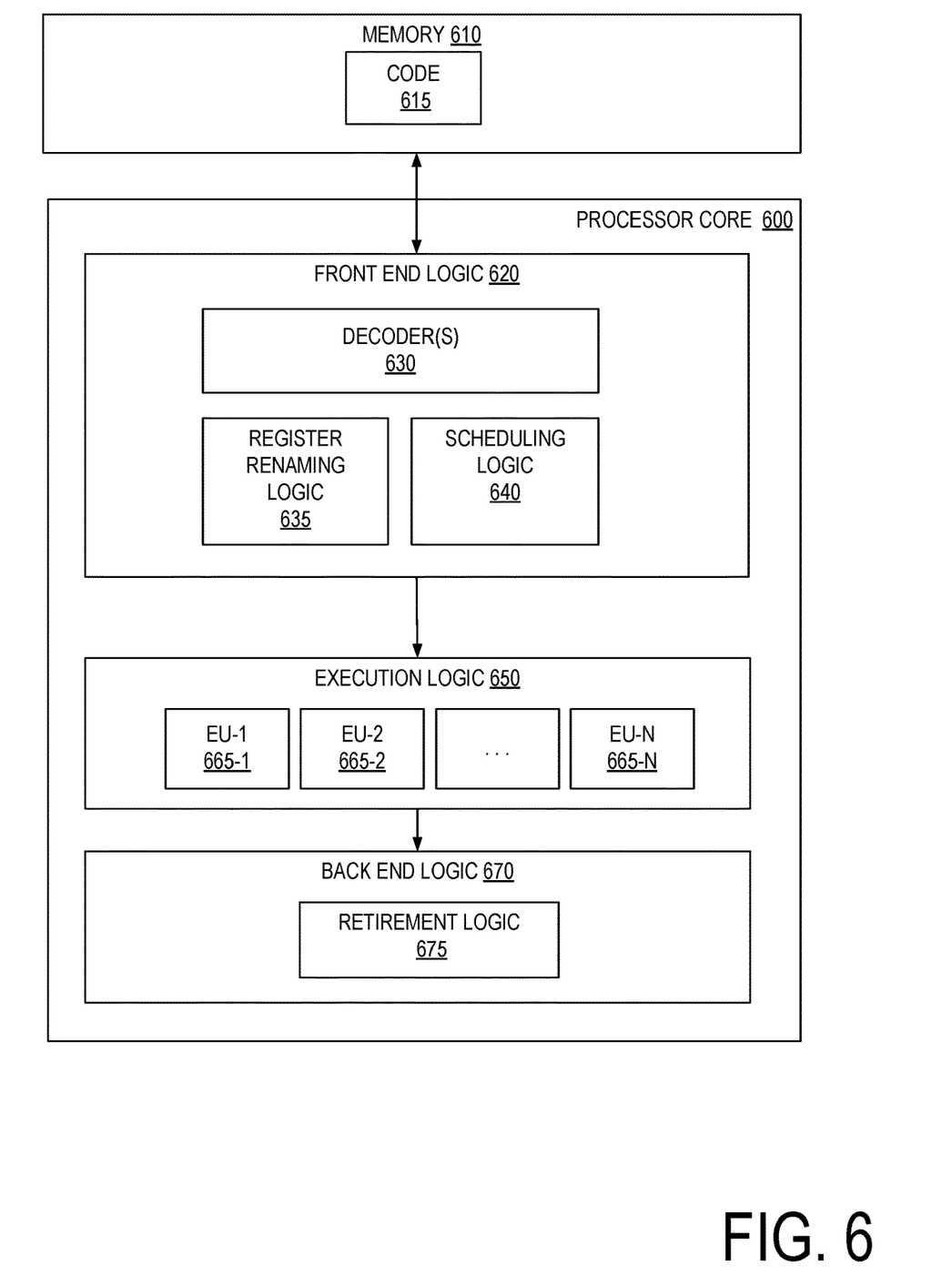
FIG. 6 is a block diagram of an exemplary processor core that can execute instructions as part of implementing technologies described herein in accordance with certain embodiments.

FIG. 6 is a block diagram of an exemplary processor core that can execute instructions as part of implementing technologies described herein in accordance with certain embodiments. The processor core 600 can be a core for any type of processor, such as a microprocessor, an embedded processor, a digital signal processor (DSP) or a network processor. The processor core 600 can be a single-threaded core or a multithreaded core in that it may include more than one hardware thread context (or "logical processor") per core.

FIG. 6 also illustrates a memory 610 coupled to the processor 600. The memory 610 can be any memory described herein or any other memory known to those of skill in the art. The memory 610 can store computer-executable instruction 615 (code) executable by the processor core 600.

The processor core comprises front-end logic 620 that receives instructions from the memory 610. An instruction can be processed by one or more decoders 630. The decoder 630 can generate as its output a micro operation such as a fixed width micro operation in a predefined format, or generate other instructions, microinstructions, or control signals, which reflect the original code instruction. The front-end logic 620 further comprises register renaming logic 635 and scheduling logic 640, which generally allocate resources and queues operations corresponding to converting an instruction for execution.

The processor core 600 further comprises execution logic 650, which comprises one or more execution units (EUs) 665-1 through 665-N. Some processor core embodiments can include a number of execution units dedicated to specific functions or sets of functions. Other embodiments can include only one execution unit or one execution unit that can perform a particular function. The execution logic 650 performs the operations specified by code instructions. After completion of execution of the operations specified by the code instructions, back-end logic 670 retires instructions using retirement logic 675. In some embodiments, the processor core 600 allows out of order execution but requires in-order retirement of instructions. Retirement logic 670 can take a variety of forms as known to those of skill in the art (e.g., re-order buffers or the like).

The processor core 600 is transformed during execution of instructions, at least in terms of the output generated by the decoder 630, hardware registers and tables utilized by the register renaming logic 635, and any registers (not shown) modified by the execution logic 650. Although not illustrated in FIG. 6, a processor can include other elements on an integrated chip with the processor core 600. For example, a processor may include additional elements such as memory control logic, one or more graphics engines, I/O control logic and/or one or more caches.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGs. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components such as scaler chip 108, display driver 110, panel 114, memory 116, processor 132, operating system 136, memory 140, I/O controller 142, GPU 144, computing device 500, processor core 600, memory 610, subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following examples pertain to additional embodiments of technologies disclosed herein.

Example 1 may comprise an apparatus comprising an interface to receive a video signal transmitted by a video source device to a first port of a plurality of ports of a display; and a controller comprising circuitry, the controller to responsive to a detection that the video source device is to enter a standby mode, cause the display to enter a low power state; and upon waking from the low power state, scan the first port of the plurality of ports for a communication from the video source device and quiesce scanning of the remaining one or more ports of the plurality of ports of the display.

Example 2 may comprise the subject matter of example 1, wherein the controller is to store context information associated with a connection between the display and the video source device; and restore the context information associated with the connection responsive to detecting the communication from the video source device.

Example 3 may comprise the subject matter of example 2, wherein the context information comprises information obtained during an initial link training process performed by the display and the video source device.

Example 4 may comprise the subject matter of example 3, wherein the information obtained during the initial link training process comprises preemphasis and voltage swing values.

Example 5 may comprise the subject matter of any one of examples 1-4, wherein the controller is to discard context information associated with a connection between the display and the video source device responsive to a determination that the first port has been disconnected during a time in which the video source device is in the standby mode.

Example 6 may comprise the subject matter of any one of examples 1-5, wherein the controller is to discard context information associated with a connection between the display and the video source device responsive to a determination that an additional video source device has been connected to a second port of the plurality of ports.

Example 7 may comprise the subject matter of any one of examples 1-6, wherein the standby mode is a Microsoft Windows Modern Standby mode.

Example 8 may comprise the subject matter of any one of examples 1-7, wherein the controller is to set a standby configuration flag responsive to the detection that the video source device is to enter the standby mode, wherein the standby configuration flag is set in a memory of the display that is readable by the video source device while the display is in the low power state.

Example 9 may comprise the subject matter of any one of examples 1-8, wherein a scaler chip comprises the interface and the controller.

Example 10 may comprise the subject matter of any one of examples 1-9, further comprising a display panel to generate light or allow for transmission of light in a plurality of pixels of the display panel.

Example 11 may comprise a method receiving, at a display, a video signal transmitted by a video source device to a first port of a plurality of ports of the display; and responsive to a detection that the video source device is to enter a standby mode, causing the display to enter a low power state; and upon waking from the low power state, scanning, by the display, the first port of the plurality of ports for a communication from the video source device and quiescing scanning of the remaining one or more ports of the plurality of ports of the display.

Example 12 may comprise the subject matter of example 11, further comprising storing context information associated with a connection between the display and the video source device; and restoring the context information associated with the connection responsive to detecting the communication from the video source device.

Example 13 may comprise the subject matter of example 12, wherein the context information comprises information obtained during an initial link training process performed by the display and the video source device.

Example 14 may comprise the subject matter of example 13, wherein the information obtained during the initial link training process comprises preemphasis and voltage swing values.

Example 15 may comprise the subject matter of any one of examples 11-14, further comprising discarding context information associated with a connection between the display and the video source device responsive to a determination that the first port has been disconnected during a time in which the video source device is in the standby mode.

Example 16 may comprise the subject matter of any one of examples 11-15, further comprising discarding context information associated with a connection between the display and the video source device responsive to a determination that an additional video source device has been connected to a second port of the plurality of ports.

Example 17 may comprise the subject matter of any one of examples 11-16, wherein the standby mode is a Microsoft Windows Modern Standby mode.

Example 18 may comprise the subject matter of any one of examples 11-17, further comprising setting a standby configuration flag responsive to the detection that the video source device is to enter the standby mode, wherein the standby configuration flag is set in a memory of the display that is readable by the video source device while the display is in the low power state.

Example 19 may comprise the subject matter of any one of examples 11-18, wherein the scanning is performed by a scaler chip of the display.

Example 20 may comprise the subject matter of any one of examples 11-19, further comprising generating light or allowing for transmission of light in a plurality of pixels of a display panel.

Example 21 may comprise an apparatus comprising a processor comprising a cache memory to store instructions to be executed; and a processor core comprising circuitry to execute an operating system; wherein the processor is to send an indication to a display that a standby mode is to be entered; store context information associated with a connection between the processor and the display; and upon a determination to exit the standby mode, determine whether to restore the context information when the connection between the processor and the display is resumed.

Example 22 may comprise the subject matter of example 21, wherein the context information comprises configuration information indicating capabilities of the display.

Example 23 may comprise the subject matter of any one of examples 21-22, wherein the context information comprises information obtained during an initial link training process performed with the display.

Example 24 may comprise the subject matter of any one of examples 21-23, wherein the processor is determine whether to restore the context information based on a result of a polling of a standby status of the display after the processor enters a state in which hot plug detection is disabled while in the standby mode.

Example 25 may comprise the subject matter of any one of examples 21-24, further comprising a battery communicatively coupled to the processor, an input/output controller communicatively coupled to the processor, or a network interface communicatively coupled to the processor.

Example 26 may comprise a method comprising sending an indication to a display that a standby mode is to be entered; storing context information associated with a connection between a processor and the display; and upon a determination to exit the standby mode, determining whether to restore the context information when the connection between the processor and the display is resumed.

Example 27 may comprise the subject matter of example 26, wherein the context information comprises configuration information indicating capabilities of the display.

Example 28 may comprise the subject matter of any one of examples 26-27, wherein the context information comprises information obtained during an initial link training process performed with the display.

Example 29 may comprise the subject matter of any one of examples 26-28, further comprising determining whether to restore the context information based on a result of a polling of a standby status of the display after the processor enters a state in which hot plug detection is disabled while in the standby mode.

Example 30 may comprise the subject matter of any one of examples 26-29, further comprising communicating between the processor and one or more of a battery communicatively coupled to the processor, an input/output controller communicatively coupled to the processor, or a network interface communicatively coupled to the processor.

We claim:

1. An apparatus comprising:
   an interface to receive a video signal transmitted by a video source device to a first port of a plurality of ports of a display; and
   a controller comprising circuitry, the controller to:
   responsive to a detection that the video source device is to enter a standby mode, cause the display to enter a low power state; and
   upon waking from the low power state, periodically scan the first port of the plurality of ports for a communication from the video source device for a time period in which scanning of the remaining one or more ports of the plurality of ports of the display is quiesced.

2. The apparatus of claim 1, wherein the controller is to:
   store context information associated with a connection between the display and the video source device; and
   restore the context information associated with the connection responsive to detecting the communication from the video source device.

3. The apparatus of claim 2, wherein the context information comprises information obtained during an initial link training process performed by the display and the video source device.

4. The apparatus of claim 3, wherein the information obtained during the initial link training process comprises preemphasis and voltage swing values.

5. The apparatus of claim 1, wherein the controller is to discard context information associated with a connection between the display and the video source device responsive to a determination that the first port has been disconnected during a time in which the video source device is in the standby mode.

6. The apparatus of claim 1, wherein the controller is to discard context information associated with a connection between the display and the video source device responsive to a determination that an additional video source device has been connected to a second port of the plurality of ports.

7. The apparatus of claim 1, wherein the standby mode is a Microsoft Windows Modern Standby mode.

8. The apparatus of claim 1, wherein the controller is to set a standby configuration flag responsive to the detection that the video source device is to enter the standby mode, wherein the standby configuration flag is set in a memory of the display that is readable by the video source device while the display is in the low power state.

9. The apparatus of claim 1, wherein a scaler chip comprises the interface and the controller.

10. The apparatus of claim 1, further comprising a display panel to generate light or allow for transmission of light in a plurality of pixels of the display panel.

11. The apparatus of claim 1, wherein periodically scanning the first port of the plurality of ports for a communication from the video source device upon waking up comprises periodically scanning a sideband channel that does not carry a video signal for a signal instructing exit from standby.

12. A method comprising:
   receiving, at a display, a video signal transmitted by a video source device to a first port of a plurality of ports of the display; and
   responsive to a detection that the video source device is to enter a standby mode, causing the display to enter a low power state; and
   upon waking from the low power state, periodically scanning, by the display, the first port of the plurality of ports for a communication from the video source device for a time period in which scanning of the remaining one or more ports of the plurality of ports of the display is quiesced.

13. The method of claim 12, further comprising:
   storing context information associated with a connection between the display and the video source device; and
   restoring the context information associated with the connection responsive to detecting the communication from the video source device.

14. The method of claim 12, further comprising discarding context information associated with a connection between the display and the video source device responsive to a determination that the first port has been disconnected during a time in which the video source device is in the standby mode.

15. The method of claim 12, further comprising discarding context information associated with a connection between the display and the video source device responsive to a determination that an additional video source device has been connected to a second port of the plurality of ports.

16. The method of claim 12, further comprising setting a standby configuration flag responsive to the detection that the video source device is to enter the standby mode, wherein the standby configuration flag is set in a memory of the display that is readable by the video source device while the display is in the low power state.

17. An apparatus comprising:
a processor comprising:
a cache memory to store instructions to be executed; and
a processor core comprising circuitry to execute an operating system;
wherein the processor is to:
send an indication to a display that a standby mode is to be entered;
store context information associated with a connection between the processor and the display; and
upon a determination to exit the standby mode, determine whether to restore the context information when the connection between the processor and the display is resumed, wherein the processor is to bring up the display using a first exit procedure if the processor determines to restore the context information and to bring up the display using a second exit procedure if the processor determines not to restore the context information, wherein the first exit procedure is faster than the second exit procedure due to reuse of the context information.

18. The apparatus of claim 17, wherein the processor is determine, based on a determination to restore the context information, to train a link between the processor and the display with a closed loop no handshake link training that is faster than a link training of the link that occurred at an initial establishment of the connection between the processor and the display.

19. The apparatus of claim 17, wherein the context information comprises configuration information indicating capabilities of the display.

20. The apparatus of claim 17, wherein the context information comprises information obtained during an initial link training process performed with the display.

21. The apparatus of claim 17, wherein the processor is determine whether to restore the context information based on a result of a polling of a standby status of the display after the processor enters a state in which hot plug detection is disabled while in the standby mode.

22. The apparatus of claim 17, further comprising a battery communicatively coupled to the processor, an input/output controller communicatively coupled to the processor, or a network interface communicatively coupled to the processor.

* * * * *